(12) United States Patent
Watanabe et al.

(10) Patent No.: US 7,535,522 B2
(45) Date of Patent: May 19, 2009

(54) LIQUID CRYSTAL DISPLAY AND METHOD OF INSPECTING THE SAME

(75) Inventors: Kenichi Watanabe, Kumamoto (JP); Yuichi Masutani, Tokyo (JP); Shigeaki Noumi, Tokyo (JP); Hitoshi Morishita, Tokyo (JP); Hiroshi Ueda, Kumamoto (JP)

(73) Assignee: Mitsubishi Denki Kabushiki Kaisha, Chiyoda-Ku, Tokyo (JP)

( * ) Notice: Subject to any disclaimer, the term of this patent is extended or adjusted under 35 U.S.C. 154(b) by 526 days.

(21) Appl. No.: 11/151,533

(22) Filed: Jun. 14, 2005

(65) Prior Publication Data

US 2005/0286005 A1 Dec. 29, 2005

(30) Foreign Application Priority Data

Jun. 24, 2004 (JP) ............... 2004-185890

(51) Int. Cl.
*G02F 1/1333* (2006.01)
*G02F 1/1345* (2006.01)
(52) U.S. Cl. .................. 349/54; 349/149; 349/151
(58) Field of Classification Search ............ 349/54, 349/149, 151, 152
See application file for complete search history.

(56) References Cited

U.S. PATENT DOCUMENTS

| | | | |
|---|---|---|---|
| 6,535,261 B1 * | 3/2003 | Anno et al. | 349/147 |
| 6,678,028 B2 * | 1/2004 | Yamate et al. | 349/151 |
| 6,777,973 B2 * | 8/2004 | Morishita | 324/770 |
| 6,955,951 B2 * | 10/2005 | Hashimoto | 438/149 |
| 2001/0002855 A1 * | 6/2001 | Onisawa et al. | 349/43 |

FOREIGN PATENT DOCUMENTS

| | | |
|---|---|---|
| JP | 04-120510 | 4/1992 |
| JP | 06-230749 | 8/1994 |
| JP | 07-152043 | 6/1995 |
| JP | 2000-321591 | 11/2000 |
| JP | 2001-005027 | 1/2001 |
| JP | 2003-167265 | 6/2003 |
| JP | 2003-167285 | 6/2003 |
| JP | 2004-138704 | 5/2004 |

OTHER PUBLICATIONS

Korean Office Action, dated Jul. 25, 2006, with English-language translation.
Office Action from corresponding Japanese Application No. 2004-185890.

* cited by examiner

*Primary Examiner*—Mike Qi
(74) *Attorney, Agent, or Firm*—Buchanan Ingersoll & Rooney PC

(57) ABSTRACT

A liquid crystal display of the present invention comprises a display portion having two opposed insulating substrates (an electrode substrate (1) and an opposed substrate 2) holding a liquid crystal layer to form a plurality of display elements, wires (3a) formed on at least one of the insulating substrates, for supplying signals to the plurality of display elements, a driver LSI (6) provided in a peripheral portion of the insulating substrate, being connected to terminals of the wires (3a, 3b) to drive a plurality of display elements, and a conductive film pattern portion formed on the wires (3a) in the peripheral portion of the insulating substrate with a first insulating layer interposed therebetween. With this constitution, a liquid crystal display which allows inspection of output signals of the driver LSI in a failure analysis, without extending wires or exposing electrode portions connected to the wires and a method of inspecting the liquid crystal display are provided.

14 Claims, 5 Drawing Sheets

LIQUID CRYSTAL DISPLAY AND METHOD OF INSPECTING THE SAME

BACKGROUND OF THE INVENTION

1. Field of the Invention

The present invention relates to a liquid crystal display and a method of inspecting the same, and more particularly to a liquid crystal display provided with a driver LSI for driving display elements and a method of inspecting the same.

2. Description of the Background Art

In terms of size-reduction and cost-reduction, in many cases, a COG (Chip On Glass) method is adopted in a liquid crystal display, where bumps of a driver LSI are directly connected to electrode terminals of wires provided on a glass substrates. In the liquid crystal display adopting the COG method or the like, when a display failure such as a line defect is found, it is necessary to judge whether the cause of failure lies in the driver LSI or in the wire.

Since the wires are covered with an insulating layer except terminals connected to the bumps of the driver LSI, however, it has not been easy to investigate the cause of display failure. Then, as a solving means, for example, a means disclosed in Patent Document 1, Japanese Patent Application Laid Open Gazette No. 2000-321591, has been suggested. In Patent Document 1, an output-side wire connected to the driver LSI on board is extended, passing through the lower part of the driver LSI. An electrode portion is formed in the extended output-side wire in the vicinity of an end of a panel, i.e., in an outer portion of the long side of the driver LSI, and check of connection of the driver LSI and check of waveform are performed by using this electrode, to thereby investigate the cause of display failure.

In the case of connection shown in Patent Document 1, since it is necessary to place an input-side wire connected to the driver LSI at a position where the input-side wire does not intersect the output-side wire, the input-side wire should be necessarily connected to a short side of the driver LSI. The shortest-distance connection could have been achieved since the input-side wire is originally connected to a long side of the driver LSI opposite to its long side to which the output-side wire is connected. When the input-side wire is extended, going around the output-side wire, and connected to the short side of the driver LSI, the input-side wire is routed long and this increases wire resistance and disadvantageously causes deterioration of input signals and power supply.

Further, as shown in Patent Document 1, the electrode portion formed in the extended output-side wire is always exposed. When there is an exposed electrode, this causes a problem of inducing corrosion of wires.

SUMMARY OF THE INVENTION

It is an object of the present invention to provide a liquid crystal display which allows inspection of output signals and output waveforms of a driver LSI in a failure analysis, without extending wires or exposing electrode portions connected to the wires, and a method of inspecting the liquid crystal display.

The present invention is intended for a liquid crystal display. According to an aspect of the present invention, the liquid crystal display includes a display portion, wires, a driver LSI and a conductive film pattern portion. The display portion has two opposed insulating substrates holding a liquid crystal layer to form a plurality of display elements. The wires are formed on at least one of the insulating substrates, for supplying signals to the plurality of display elements. The driver LSI is provided in a peripheral portion of the insulating substrate, being connected to terminals of the wires to drive the plurality of display elements. The conductive film pattern portion is formed on the wires positioned in the peripheral portion of the insulating substrate with a first insulating layer interposed therebetween.

In the liquid crystal display of the present invention, since the conductive film pattern portion is provided on the wires positioned in the peripheral portion of the insulating substrate with the first insulating layer interposed therebetween, it is possible to provide terminals used for investigating the cause of failure without extending the wires or exposing electrode portions connected to the wires and this produces an effect of making it possible to easily inspect an output signal or an output waveform of the driver LSI only by welding a predetermined portion with a laser in a failure analysis.

According to another aspect of the present invention, the liquid crystal display includes a display portion, wires and a driver LSI. The display portion has two opposed insulating substrates holding a liquid crystal layer to form a plurality of display elements. The wires are formed on at least one of the insulating substrates, for supplying signals to the plurality of display elements. The driver LSI is so provided on the insulating substrate as to be connected to input terminals of the wires, for driving the plurality of display elements. Further, each of the wires includes a measurement pattern portion provided in a peripheral portion of the insulating substrate, for measuring a signal flowing in each of the wires. The measurement pattern portion is covered with a first insulating layer.

In the liquid crystal display of the present invention, since the measurement pattern portion covered with the first insulating layer is provided on each of the wires positioned in the peripheral portion of the insulating substrate, it is possible to provide terminals used for investigating the cause of failure without extending the wires or exposing electrode portions connected to the wires and this produces an effect of making it possible to easily inspect an output signal or an output waveform of the driver LSI only by welding a predetermined portion with a laser in a failure analysis.

These and other objects, features, aspects and advantages of the present invention will become more apparent from the following detailed description of the present invention when taken in conjunction with the accompanying drawings.

DESCRIPTION OF THE PREFERRED EMBODIMENTS

The First Preferred Embodiment

Figure 1:
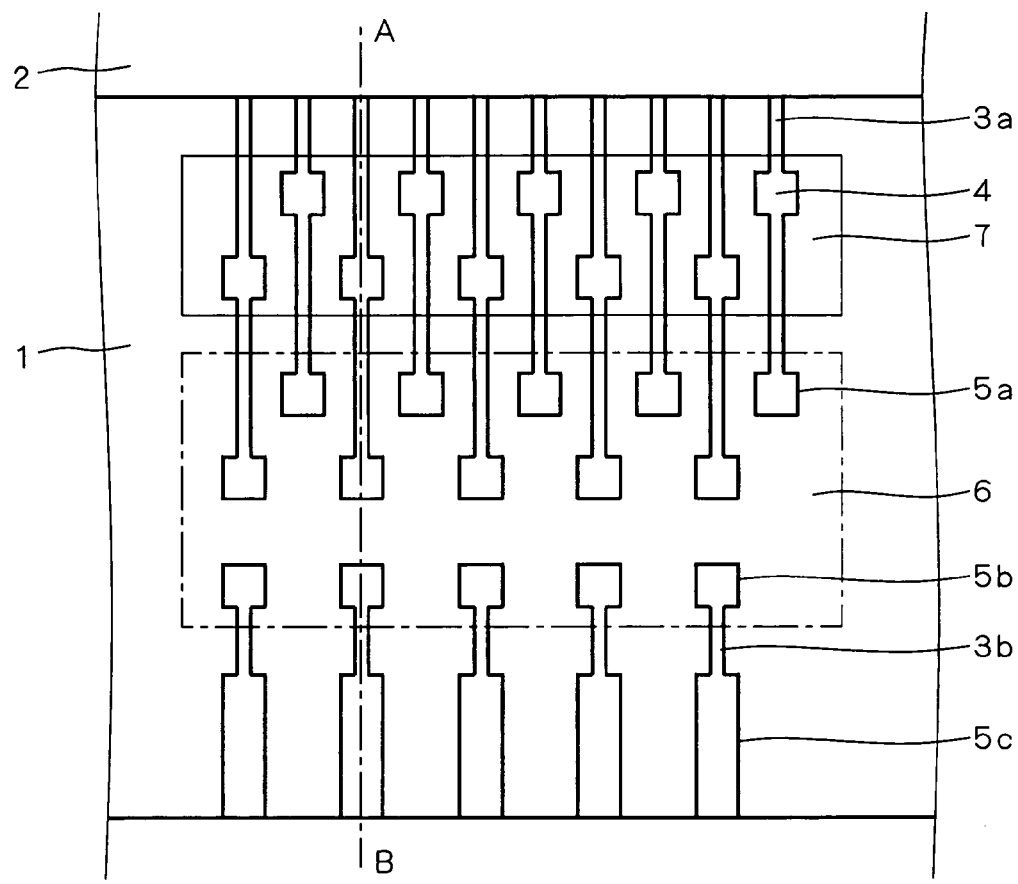
FIG. 1 is a plan view showing an electrode terminal portion of a liquid crystal display in accordance with a first preferred embodiment of the present invention.

The preferred embodiments of the present invention will be discussed below, referring to the drawings. FIG. 1 is a plan view showing an electrode terminal portion of a liquid crystal display in accordance with the first preferred embodiment of the present invention. First, brief description will be made on a structure of the liquid crystal display. The liquid crystal display comprises a display portion having two opposed insulating substrates (e.g., glass substrates), i.e., an electrode substrate 1 and an opposed substrate 2, which hold a liquid crystal layer therebetween to form a plurality of liquid crystal display elements. Though not shown, on the electrode substrate 1 in the display portion, a plurality of gate wires and a plurality of source wires are provided and near the intersection of these wires, thin film transistors serving as switching elements are arranged. And pixel electrodes and the like which are connected to the thin film transistors are arranged in matrix (not shown).

On the opposed substrate 2 of the display portion formed are a counter electrode formed of transparent conductive film, a colored filter for color display, a black matrix placed between pixels and the like (all are not shown). The electrode substrate 1 and the opposed substrate 2 are superimposed on each other with a liquid crystal layer and a spacer interposed therebetween and sealed by a sealing material. Further, on part of the electrode substrate 1 which is positioned in an outer portion of the display portion (hereinafter, referred to as a peripheral portion of the electrode substrate 1), an electrode terminal portion is formed and a driver LSI 6 serving as a driving IC for driving liquid crystal display elements is mounted in the COG manner.

In FIG. 1, a plurality of output-side wires 3a are provided in the peripheral portion of the electrode substrate 1. This output-side wire 3a is connected to a source wire formed on the electrode substrate 1 of the display portion, to supply a signal from the driver LSI 6 to a thin film transistor. On the other hand, a plurality of input-side wires 3b are provided in an area from an end portion of the electrode substrate 1 (the lower side of FIG. 1) to the driver LSI 6. This input-side wire 3b supplies a signal or a power required for the driver LSI 6.

The liquid crystal display of the first preferred embodiment adopts the COG method as shown in FIG. 1. Therefore, on the output-side wire 3a and the input-side wire 3b, electrode terminals 5a and 5b are provided, respectively, to be connected to bumps (not shown) formed on the driver LSI 6. Further, on the input-side wire 3b, an electrode terminal 5c for external input is provided on a side opposite to the side connected to the driver LSI 6. Furthermore, in the liquid crystal display of the first preferred embodiment, measurement pattern portions 4 for inspecting output signals of the driver LSI 6 are provided in the output-side wires 3a.

Each of the measurement pattern portions 4 is formed to be wider than the width of the output-side wire 3a and the measurement pattern portions 4 are arranged in a staggered manner to ensure a distance between adjacent measurement pattern portions 4. On the measurement pattern portions 4, a conductive film pattern portion 7 is provided with an insulating layer (not shown) interposed therebetween. The conductive film pattern portion 7 of FIG. 1 is formed of an ITO (Indium Tin Oxide). Further, the conductive film pattern portion 7 extends across a plurality of output-side wires 3a which are connected to the same driver LSI 6.

Figure 2:
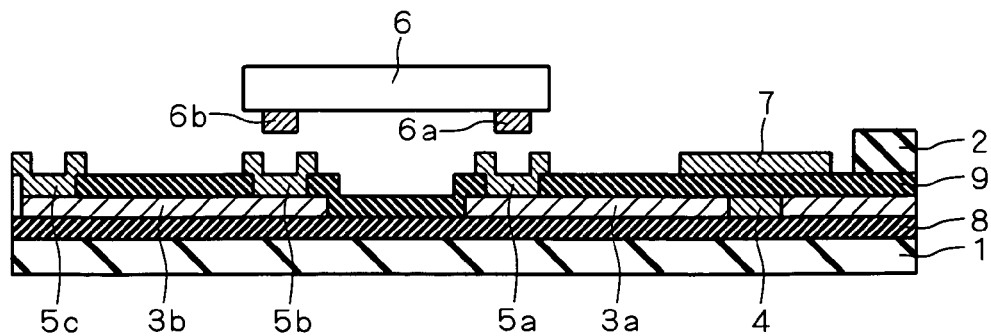
FIGS. 2 and 3 are cross sections each showing the electrode terminal portion of the liquid crystal display in accordance with the first preferred embodiment of the present invention.

Next, detailed discussion will be made on the electrode terminal portion. FIG. 2 is a cross section showing the electrode terminal portion of FIG. 1 taken along the section A-B. The electrode terminal portion of FIG. 2 is an electrode terminal portion on the side of source wire. A gate insulating film 8 is layered on the peripheral portion of the electrode substrate 1 shown in FIG. 2 and on this gate insulating film 8, the output-side wire 3a and the input-side wire 3b are formed. An electrode terminal 5a which joins to an output bump 6a of the driver LSI 6 is provided at a tip portion of the output-side wire 3a and the measurement pattern portion 4 is provided at the center of the output-side wire 3a. A protection film 9 which is an insulating layer is provided on the output-side wire 3a and the conductive film pattern portion 7 formed of an ITO is provided on the protection film 9 immediately above the measurement pattern portion 4.

On the other hand, an electrode terminal 5b which joins to an input bump 6b of the driver LSI 6 is provided at a tip portion of the input-side wire 3b on the side of the opposed substrate 2, and an electrode terminal 5c for external input is provided at the other tip portion. On the driver LSI 6, a plurality of bumps 6a and 6b are provided. Therefore, it is necessary to closely arrange the electrode terminals 5a and 5b as many as the bumps 6a and 6b in the peripheral portion of the electrode substrate 1 and these electrode terminals 5a and 5b constitute an electrode terminal block.

Next, a method of manufacturing the liquid crystal display of the first preferred embodiment will be discussed. Particularly, a method of manufacturing the electrode substrate 1 will be discussed below. First, a metal film such as Cr, Al, Ta, Ti or Mo, or an alloy film formed mainly of the above metal component is formed on a transparent insulating substrate such as no alkali glass (e.g., AN635 as a trade name) by sputtering and a pattern is formed by photolithography, to thereby form a gate electrode, the gate wire of the display portion, the gate wire of the electrode terminal portion and the like at the same time.

Next, an SiN film, for example, is formed by a plasma CVD method to form the gate insulating film. Subsequently, an amorphous Si to become a channel layer and an $N^+$-type amorphous Si to become a contact layer are connected onto the gate electrode, the gate wire and the gate insulating film. After the film formation, a pattern is formed by photolithography to form a thin film transistor for driving liquid crystal display elements of the display portion. Then, a metal film such as Cr, Al, or Mo, or an alloy film formed mainly of the above metal component is formed thereon and a pattern is formed by photolithography, to thereby form a drain electrode, a source electrode, the source wire of the display portion, the source wire of the electrode terminal portion and the like at the same time.

Next, in order to prevent a DC component from being applied to the liquid crystal layer, an SiN film or the like is formed by the plasma CVD method, to form the protection film. After that, the insulating film on the electrode terminals of the gate wire and the source wire is removed. Finally, an ITO is formed by sputtering and a pattern is formed by photolithography, to thereby form the pixel electrode. At the same time, an ITO is also formed on the electrode terminals of the gate wire and the source wire in the electrode terminal portion. By forming this ITO, the electrode terminals formed of wire material such as Cr or Al are not exposed, so as not to prevent formation of an oxide film on the electrode terminals and conduction failure with external input. Through the above manufacturing process, the electrode substrate 1 of the liquid crystal display of the first preferred embodiment is completed. A method of manufacturing the opposed substrate 2, an assembly process where the electrode substrate 1 and the opposed substrate 2 are superimposed and adhered to each other and liquid crystal is injected thereinto, and the like are not discussed herein.

Figure 3:
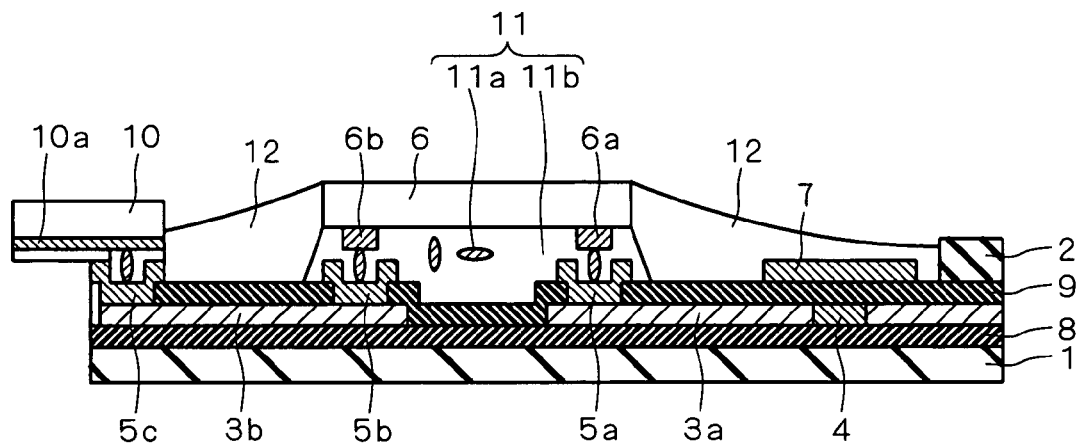

Next, a method of mounting the driver LSI 6 on the electrode substrate 1 will be discussed, referring to FIG. 3. First, on the electrode terminals 5a and 5b formed in the peripheral portion of the electrode substrate 1 of FIG. 3, an ACF (Anisotropic Conductive Film) 11 is adhered. Subsequently, a plurality of bumps 6a and 6b formed of Au on a back surface of the driver LSI 6 and the electrode terminals 5a and 5b are aligned with high accuracy and then thermal compression bonding is performed by using a heating and pressing tool. The bonding is performed under a condition, e.g., where the heating temperature is 170° to 200° C., the time is 10 to 20 seconds and the pressure is 30 to 100 Pa. Through the thermal compression bonding, the bumps 6a and 6b and the electrode terminals 5a and 5b are brought into conduction, respectively, with conductive particles 11a of the ACF 11 between the output bump 6a of the driver LSI 6 and the electrode terminal 5a and between the input bump 6b and the electrode terminal 5b. In other words, by the thermal compression bonding with the ACF 11, the driver LSI 6 is electrically connected to the electrode terminals 5a and 5b of the liquid crystal display.

In the ACF 11, an insulative epoxy resin 11b is present around the conductive particles 11a in the horizontal direction, to thereby ensure insulation. Subsequently, connection between an FPC (Flexible Printed Circuit) 10 for connection of external input and the electrode terminal 5c for external input is also established by using the ACF 11. The FPC 10 is constituted of a polyimide film having a thickness of about 30 to 70 ì m, a copper foil 10a having a thickness of 8 to 25 ì m and a polyimide base solder resist.

Finally, an insulative coating material 12 is applied to the electrode terminal portion including the wires 3b between the driver LSI 6 and the FPC 10. As the coating material 12, mainly, a silicon resin, an acrylic resin, a fluorocarbon resin, a polyurethane resin or the like is used and applied by using a dispenser. The coating material 12 is applied to the electrode terminal portion, to thereby prevent corrosion of wires.

Figure 4:
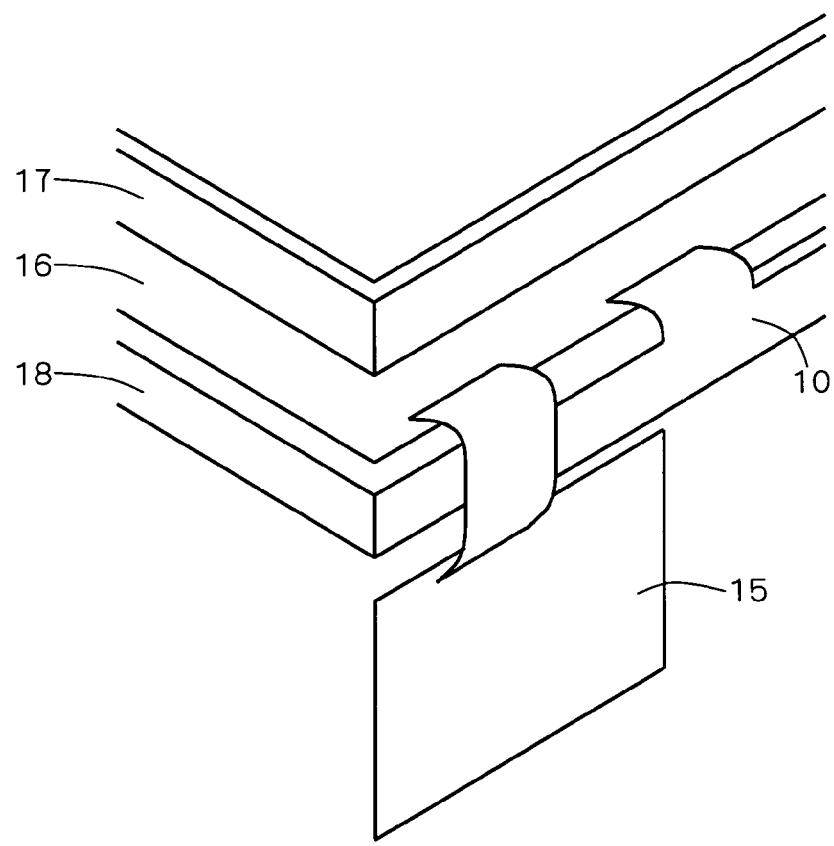
FIG. 4 is an assembly diagram of the liquid crystal display in accordance with the first preferred embodiment of the present invention.

Next, a method of fabricating the liquid crystal display will be discussed, referring to FIG. 4. In fabrication of the liquid crystal display of the first preferred embodiment, a liquid crystal panel 16 in which the driver LSI 6 is mounted on the electrode substrate 1 is placed on a backlight 18 serving as a flat light emitting source and a front frame 17 is fitted thereinto from a front surface side of the liquid crystal panel 16. The FPC 10 connected to the electrode substrate 1 is connected to a circuit board 15.

Figure 5:
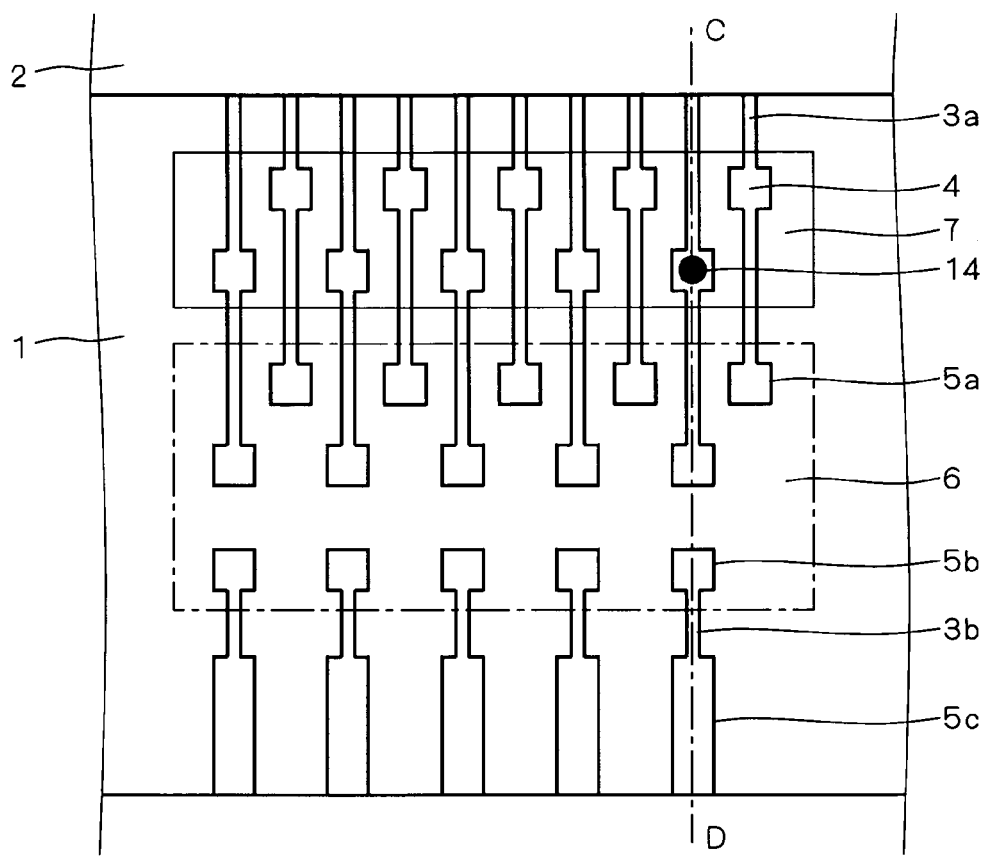
FIG. 5 is a plan view showing a state of the electrode terminal portion after laser radiation in the liquid crystal display in accordance with the first preferred embodiment of the present invention.
Figure 6:
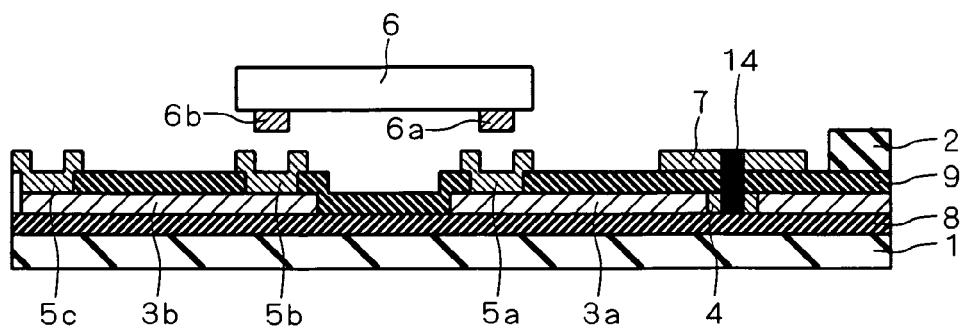
FIG. 6 is a cross section showing the state of the electrode terminal portion after laser radiation in the liquid crystal display in accordance with the first preferred embodiment of the present invention.

Next, a method of inspecting a display failure in the liquid crystal display of the first preferred embodiment will be discussed. The discussion is made, referring to FIGS. 5 and 6. FIG. 6 is a cross section taken along the section C-D of the plan view of FIG. 5. In this inspection, first, in the liquid crystal display panel on which the driver LSI 6 and the FPC 10 are mounted thereon, a signal generator sequentially inputs signals to the source wires. A portion of the display portion where a predetermined video signal is not obtained after the input of the signal, i.e., an address at which a display failure such as a line defect occurs, is specified by the function of the signal generator. In FIG. 5, the second wire 3a from the right side.

Subsequently, a laser is radiated to a superposed portion of the measurement pattern portion 4 and the conductive film pattern portion 7 on the wire 3a at this address from a back surface side of the electrode substrate 1, i.e., the side of the glass substrate. In FIG. 5, a laser imprint 14 is formed in the measurement pattern portion 4 on the second wire 3a from the right side. With this laser radiation, the metal of the measurement pattern portion 4 penetrates the protection film 9 with heat to come into contact with the conductive film pattern portion 7 and the measurement pattern portion 4 and the conductive film pattern portion 7 are thereby short-circuited and electrically connected to each other. The cross section of FIG. 6 shows a state where the measurement pattern portion 4 and the conductive film pattern portion 7 are short-circuited. In order to ensure conduction, it is preferable that the laser radiation should be performed several times.

Figure 7:
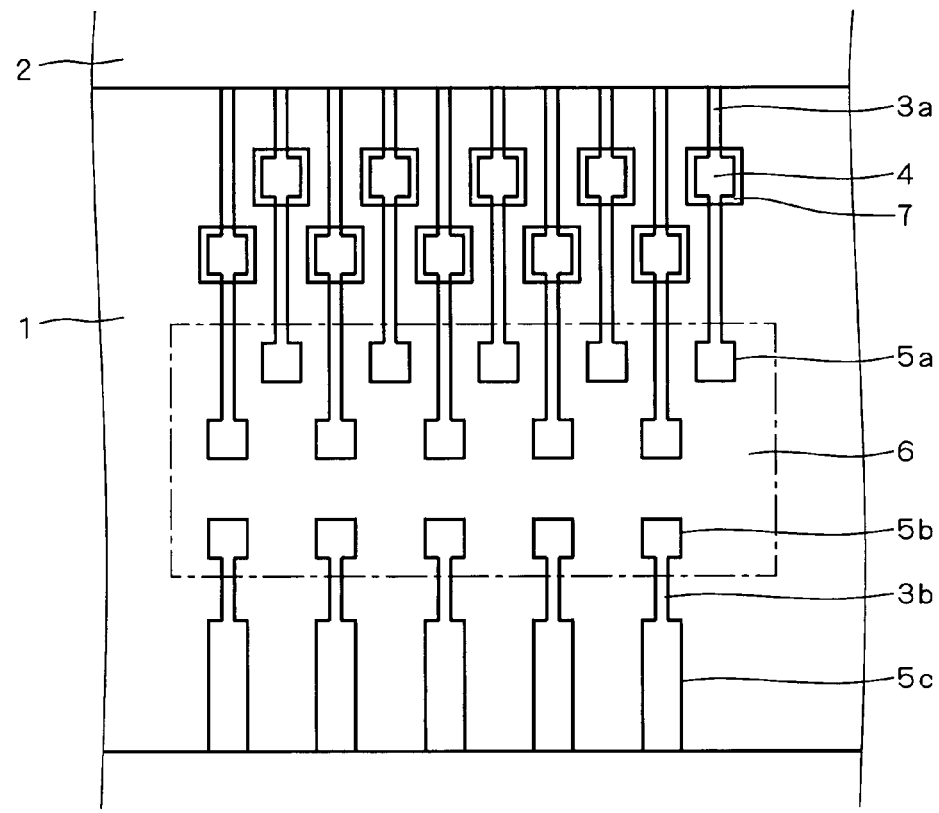
FIGS. 7 to 9 are plan views each showing the electrode terminal portion of the liquid crystal display in accordance with the first preferred embodiment of the present invention.

Though the conductive film pattern portion 7 extends across a plurality of output-side wires 3a in FIG. 1, the conductive film pattern portion 7 is individually provided for each measurement pattern portion 4 as shown in FIG. 7. By this individual provision of the conductive film pattern portion 7, even if a plurality of failures occur on a plurality of wires which are connected to the same driver LSI 6, it is possible to investigate the cause of failure.

Further, as shown in FIG. 7, by making the widths of the measurement pattern portion 4 and the conductive film pattern portion 7 larger than that of the output-side wire 3a, it is possible to ensure a sufficient radiation area of laser. Since the laser is radiated from the back surface side of the electrode substrate 1, the conductive film pattern portion 7 is made larger than the measurement pattern portion 4 for easy conduction. Furthermore, though not shown, in order to easily find the measurement pattern portion 4 to be irradiated with the laser, the conductive film pattern portions 7 may have a plurality of shapes which are different for each wire. For example, there may be a case where the conductive film pattern portions 7 of square shape are provided for the wires having addresses of 1 to 10 and the conductive film pattern portions 7 of round shape are provided for the wires having addresses of 11 to 20.

After the conduction between the measurement pattern portion 4 and the conductive film pattern portion 7 is established by laser radiation, a probe or a needle of a measuring device such as an oscilloscope or a digital multimeter is brought into contact with the conductive film pattern portion 7. The measuring device connected to the conductive film pattern portion 7 measures an output signal or an output waveform from the driver LSI 6 connected to a wire having a failure portion, to investigate the cause of failure.

Figure 8:
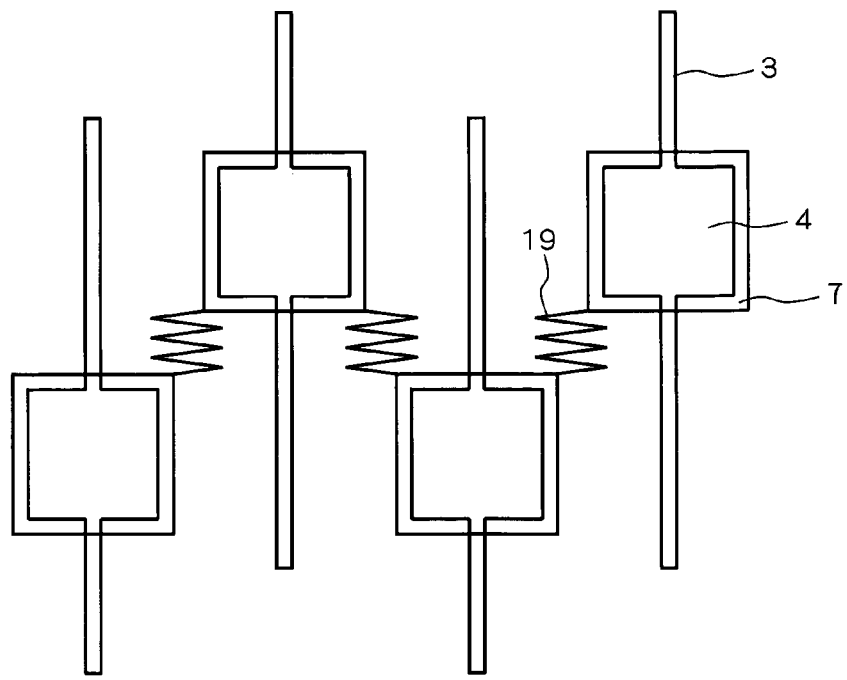

Further, in measurement by the measuring device, since it is thought that the protection film 9 between the conductive film pattern portion 7 and the measurement pattern portion 4 might be broken by static electricity, at least one of a long-range connecting line 19 formed of a conductive film, a high-resistance silicon film or a bidirectional transistor is provided between the adjacent conductive film pattern portions 7, as shown in FIG. 8, to cause a short circuit. In other words, by connecting the adjacent conductive film pattern portions 7 in a high-resistance state, the static electricity is taken by a plurality of conductive film pattern portions 7 to prevent the breakage of the protection film 9 due to the static electricity.

As discussed above, in the liquid crystal display of the first preferred embodiment, since the conductive film pattern portion 7 is provided on the wires 3a in the peripheral portion of the electrode substrate 1 with the protection film 9 serving as the insulating layer interposed therebetween, it is possible to provide terminals used for investigating the cause of failure without extending the wires or exposing the electrode portion connected to the wires. Then, in a failure analysis, by welding a predetermined portion with a laser, it is possible to easily inspect the output signal or the output waveform of the driver LSI 6.

Further, in the liquid crystal display of the first preferred embodiment, sine the measurement pattern portions 4 are formed in the wires 3a provided immediately below the conductive film pattern portion 7, it is possible to easily specify the radiation point in the laser radiation from the back surface side of the electrode substrate 1 and therefore possible to improve working efficiency.

Furthermore, in the liquid crystal display of the first preferred embodiment, since the measurement pattern portions 4 and the conductive film pattern portions 7 are arranged in a staggered manner, it is possible to make the measurement pattern portions 4 and the conductive film pattern portions 7 larger without establishing a short circuit between adjacent patterns and easily establish conduction between the measurement pattern portions 4 and the conductive film pattern portions 7. Moreover, since the conductive film pattern portions 7 can be formed simultaneously with the formation of the pixel electrodes serving as a conductive film of the display elements, it is possible to simplify the manufacturing process and reduce the manufacturing cost.

Figure 9:
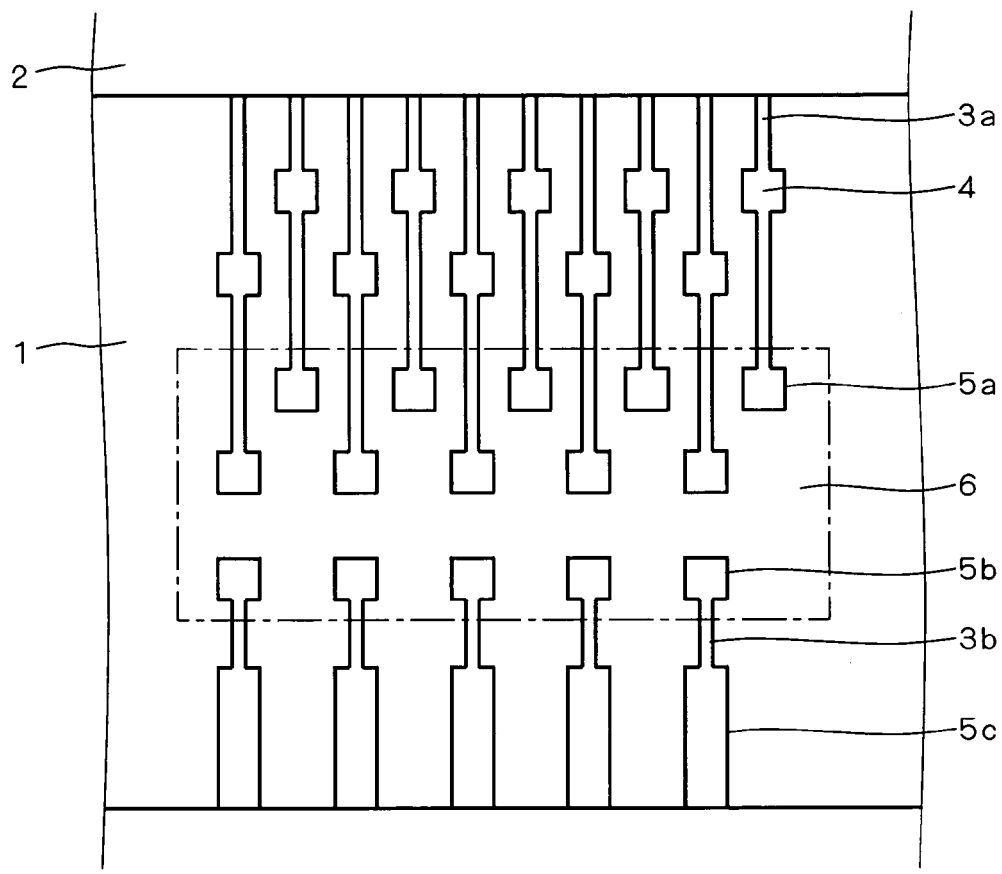

Though the conductive film pattern portion 7 is provided on the measurement pattern portions 4 with the protection film 9 interposed therebetween in the first preferred embodiment, there may be a case where no conductive film pattern portion 7 is provided as shown in FIG. 9. In the failure analysis, however, it is necessary to apply a conductive material such as silver paste, instead of the conductive film pattern portion 7, onto the protection film 9 and weld the conductive material and the measurement pattern portions 4 with a laser.

The Second Preferred Embodiment

Figure 10:
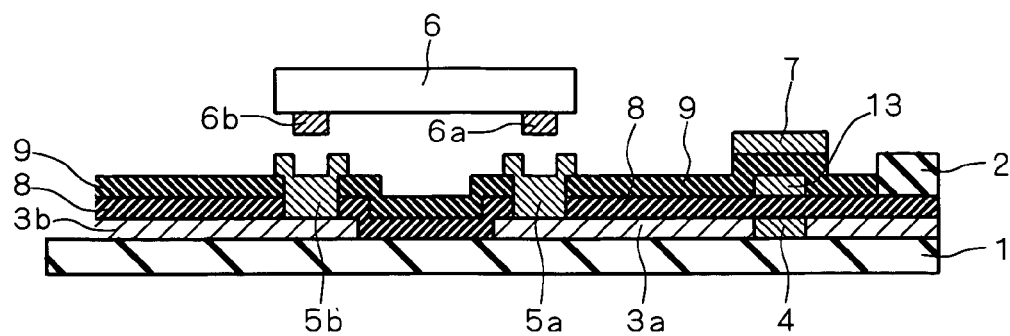
FIG. 10 is a cross section showing an electrode terminal portion of a liquid crystal display in accordance with a second preferred embodiment of the present invention.

FIG. 10 is a cross section showing an electrode terminal portion on the gate side in a liquid crystal display in accordance with the second preferred embodiment of the present invention. In the peripheral portion of the electrode substrate 1 of FIG. 10, a plurality of output-side wires 3a and a plurality of input-side wires 3b which are connected to a plurality of liquid crystal display elements in the display portion are arranged. At a tip portion of the output-side wire 3a, the electrode terminal 5a which joins to the output bump 6a of the driver LSI 6 is provided. Further, at the center of the output-side wire 3a, the measurement pattern portion 4 is provided.

In the second preferred embodiment, a metal pad portion 13 is further provided on the measurement pattern portion 4 with the gate insulating film 8 serving as the insulating layer interposed therebetween. Above the metal pad portion 13, the conductive film pattern portion 7 of ITO is provided with the protection film 9 serving as the insulating layer interposed therebetween. In summary, though the first preferred embodiment has a layered structure consisting of the measurement pattern portion 4, the insulating layer and the conductive film pattern portion 7 from the lower side, the second preferred embodiment has a layered structure consisting of the measurement pattern portion 4, the insulating layer, the metal pad portion 13, the insulating layer and the conductive film pattern portion 7 from the lower side.

On the other hand, at the tip portion of the input-side wire 3b, the electrode terminal 5b which joins to the input bump 6b of the driver LSI 6 is provided. The electrode terminals 5a and 5b as many as a plurality of bumps 6a and 6b of the driver LSI 6 are needed and these electrode terminals 5a and 5b which are closely arranged constitute an electrode terminal block.

The manufacturing method of the electrode substrate 1, the mounting method of the driver LSI 6 and the fabricating method of the liquid crystal display are the same as those in the first preferred embodiment and therefore detailed discussion on these will be omitted. Next, an inspection method in the case where a display failure occurs in the liquid crystal display of the second preferred embodiment will be discussed. Basically, the inspection method of the second preferred embodiment is almost the same as that of the first preferred embodiment.

In the inspection, first, in liquid crystal display panel on which the driver LSI 6 and the FPC 10 are mounted, the signal generator sequentially inputs signals to the source wires. A portion of the display portion where a predetermined video signal is not obtained after the input of the signal, i.e., an address at which a display failure such as a line defect occurs, is specified by the function of the signal generator. Subsequently, a laser is radiated to a superposed portion of the measurement pattern portion 4, the metal pad portion 13 and the conductive film pattern portion 7 on the wire 3a at this address from the back surface side of the electrode substrate 1, i.e., the side of the glass substrate.

With this laser radiation, the metals of the measurement pattern portion 4 and the metal pad portion 13 penetrate the protection film 9 with heat to come into contact with the conductive film pattern portion 7 and the measurement pattern portion 4 and the conductive film pattern portion 7 are thereby short-circuited and electrically connected to each other. In the second preferred embodiment, by providing the metal pad portion 13, a larger amount of metal penetrates the insulating layer with the laser and the conduction between the measurement pattern portion 4 and the conductive film pattern portion 7 can be easily established. Further, in order to ensure conduction, it is preferable that the laser radiation should be performed several times.

After the conduction between the measurement pattern portion 4 and the conductive film pattern portion 7 is established by laser radiation, a probe or a needle of a measuring device such as an oscilloscope or a digital multimeter is brought into contact with the conductive film pattern portion 7. The measuring device connected to the conductive film pattern portion 7 measures an output signal or an output waveform from the driver LSI 6 connected to a wire having a failure portion, to investigate the cause of failure.

Also in the second preferred embodiment, the conductive film pattern portion 7 may be individually provided for each measurement pattern portion 4 as shown in FIG. 7. By this individual provision of the conductive film pattern portion 7, even if a plurality of failures occur on a plurality of wires which are connected to the same driver LSI 6, it is possible to investigate the cause of failure.

Further, also in the second preferred embodiment, as shown in FIG. 7, by making the widths of the measurement pattern portion 4 and the conductive film pattern portion 7 larger than that of the output-side wire 3a, it is possible to ensure a sufficient radiation area of laser. Since the laser is radiated from the back surface side of the electrode substrate 1, the conductive film pattern portion 7 is made larger than the measurement pattern portion 4 for easy conduction. Furthermore, though not shown, also in the second preferred embodiment, in order to easily find the measurement pattern portion 4 to be irradiated with the laser, the conductive film pattern portions 7 may have a plurality of shapes which are different for each wire.

Furthermore, also in the second preferred embodiment, in measurement by the measuring device, since it is thought that the protection film 9 between the conductive film pattern portion 7 and the measurement pattern portion 4 might be broken by static electricity, at least one of a long-range connecting line 19 formed of a conductive film, a high-resistance silicon film or a bidirectional transistor is provided between the adjacent conductive film pattern portions 7, as shown in FIG. 8, to cause a short circuit.

As discussed above, in the second preferred embodiment, since the metal pad portion 13 and the protection film 9 serving as the insulating layer formed on the metal pad portion are further provided between the gate insulating film 8 serving as the insulating layer and the conductive film pattern portion 7, a larger amount of metal penetrates the insulating layer with the laser and the conduction between the measurement pattern portion 4 and the conductive film pattern portion 7 can be easily established.

Further, also in the second preferred embodiment, there may be a case where no conductive film pattern portion 7 is provided as shown in FIG. 9. In the failure analysis, however, it is necessary to apply a conductive material such as silver paste, instead of the conductive film pattern portion 7, onto the protection film 9 and weld the conductive material and the measurement pattern portions 4 with a laser.

While the invention has been shown and described in detail, the foregoing description is in all aspects illustrative and not restrictive. It is therefore understood that numerous modifications and variations can be devised without departing from the scope of the invention.

What is claimed is:

1. A liquid crystal display comprising:
   a display portion having two opposed insulating substrates holding a liquid crystal layer to form a plurality of display elements;
   wires formed on at least one of said insulating substrates, for supplying signals to said plurality of display elements;
   a driver LSI provided in a peripheral portion of said insulating substrate, being connected to terminals of said wires to drive said plurality of display elements; and
   a conductive film pattern portion formed between said display portion and said driver LSI over said wires positioned in said peripheral portion of said insulating substrate with a first insulating layer interposed therebetween.

2. The liquid crystal display according to claim 1, wherein said conductive film pattern portion includes a plurality of conductive film pattern portions each of which is individually formed for each of said wires.

3. The liquid crystal display according to claim 2, wherein said conductive film pattern portions have a predetermined shape for each of said wires.

4. The liquid crystal display according to claim 2, wherein at least one of a connecting line formed of a conductive film, a silicon film and a bidirectional transistor is provided between adjacent said conductive film pattern portions in order to establish a short circuit between said adjacent conductive film pattern portions in a predetermined high-resistance state.

5. The liquid crystal display according to claim 1, further comprising
   measurement pattern portions in said wires, respectively, which are positioned immediately below said conductive film pattern portion.

6. The liquid crystal display according to claim 5, wherein each of said conductive film pattern portions is larger than respective measurement pattern portions.

7. The liquid crystal display according to claim 5, wherein said measurement pattern portions and said conductive film pattern portions are arranged in a staggered manner.

8. A method of inspecting the liquid crystal display as defined in claim 5, comprising the steps of:
   (a) specifying one of said wires in which a failure occurs in said display portion and connecting one of said measurement pattern portions and said conductive film pattern portion which are provided in said specified wire through laser radiation; and
   (b) connecting a measuring device to said conductive film pattern portion which is connected to said measurement pattern portions in said step (a) to measure an output signal from said driver LSI.

9. The liquid crystal display according to claim 1, further comprising
   a metal pad portion and a second insulating layer formed on said metal pad portion which are provided between said first insulating layer and said conductive film pattern portion.

10. The liquid crystal display according to claim 1, wherein said conductive film pattern portion is covered with a coating material.

11. The liquid crystal display according to claim 1, wherein said conductive film pattern portion is formed in the same process as a conductive film of said display elements is formed.

12. The liquid crystal display according to claim 1, wherein the conductive film pattern portions are configured in a plurality of shapes.

13. A liquid crystal display comprising:
   a display portion having two opposed insulating substrates holding a liquid crystal layer to form a plurality of display elements;
   wires formed on at least one of said insulating substrates, for supplying signals to said plurality of display elements; and
   a driver LSI being so provided on said insulating substrate as to be connected to input terminals of said wires, for driving said plurality of display elements,
   wherein each of said wires comprises
   a measurement pattern portion provided in a peripheral portion of said insulating substrate between said display portion and said driver LSI, for measuring a signal flowing in each of said wires, and
   said measurement pattern portion is covered with a first insulating layer.

14. The liquid crystal display according to claim 13, wherein
   said measurement pattern portion is so formed as to be wider than the width of each of said wires.

* * * * *